United States Patent Office 3,139,379
Patented June 30, 1964

3,139,379
COMPOSITIONS AND METHODS FOR REPELLING RODENTS WITH PENTACHLOROBENZYLMER-
CAPTANS
Harold J. Miller, Tacoma, Wash., assignor to Pennsalt Chemicals Corporation, Philadelphia, Pa., a corporation of Pennsylvania
No Drawing. Filed June 1, 1962, Ser. No. 199,235
6 Claims. (Cl. 167—46)

This invention relates to novel means of protecting property against damage by animals and is particularly concerned with the use of certain pentachlorobenzylmercaptans to repel domestic animals, wildlife such as rodents, birds, deer, and the like.

In accord with this invention the useful animal repellents are pentachlorobenzylmercaptan derivatives of structure

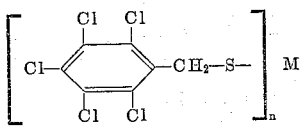

where M is a member of the group consisting of hydrogen and zinc, $n$ being a small digit corresponding to the valence of M. Thus, specific compounds include pentachlorobenzylmercaptan and its zinc salt.

The compounds above described may be used in numerous ways depending on the specific article or area to be treated.

In the case of packaged goods, such as packaged foods, it is expedient to treat the wrapping or packaging material with one or more of the above compounds, and this may be done either before or after the article is packaged. Alternatively, the package may be provided with a liner that has been treated with the compound, or tapes containing the repellent compounds may be pasted over areas (particularly the corners) of the packages which are particularly accessible to rodents.

Likewise, the compounds of this invention may be used to protect ropes in use or in storage, insulating materials and other materials of construction, etc., which materials are often damaged by rodents during storage and use.

The compounds may also be used to discourage rodents from remaining in a particular area even though they do not cause physical damage. The presence of rodents is undesirable for a number of reasons including the filth and disease which they spread, the disturbances they cause, etc., and by the use of the repellent compounds of this invention such adverse effects of rodents may be alleviated.

When large areas are to be protected a coating containing the repellent compound may be painted in the area or the compound may be distributed by dusting the powder or spraying a liquid formulation. Other means of application may be used as will become apparent from the following examples and discussion.

One or more of the compounds, or formulations containing them, may be used to coat or impregnate materials including woven and non-woven cellulosic articles (such as paper, cardboard, wood, sisal, hemp, etc.), textiles such as cottons and other natural cellulosic-containing materials, regenerated cellulosic fibers and the like. Likewise woolens and other proteinaceous materials may be protected and other synthetics, including woven and non-woven polyamides, polyacrylonitriles, polyacrylates, etc. may be protected by means of the invention.

The compounds will also be of great value in agricultural and forestry applications to protect various seeds, tree seeds and tree seedlings from rodents and browsing animals. The compounds may be used to protect fruit and forest trees from damage caused by deer and from bark injury from wild mice and rabbits. The compounds also have a repellent effect on birds, and when seeds are treated with the compounds and broadcast, their consumption by birds is mitigated.

Suitable treatment of various products may also be achieved by coating or impregnation, by spraying, roller application, paper deposition, brushing, dipping, and the like. In some applications, as for example in making paper, the agent may be included in the beater pulp during manufacture. In a similar fashion, resinous sheeting such as polyvinyl alcohol and polyvinyl acetate sheets may be protected by adding the compound prior to polymerization.

Likewise the agents may be included in paints, shellac, varnishes and the like at a repellent concentration which will not, of course, interfere with the film-forming characteristics of the formulations. Likewise, mortar, concrete, etc. may be treated to produce rodent repellent effects.

The repellent compounds may also be formulated in a water base with carrier such as starches, e.g., potato starch and corn starch, methyl cellulose, casein, various polymerizable monomers and copolymers such as styrene, methyl methacrylate, vinyl chloride, vinyl chloride-vinyl acetate, high suspension clays, and the like.

Solid formulations such as dusts for the repellent compounds are also useful and these may be prepared by spraying a solution of the compound onto a highly absorptive material such as highly absorptive silica or by mixing the pulverized compound with a diluent in a suitable blender. Addition of other finely divided materials such as chalk, calcium carbonate, talc, sodium silicate, wood flour, calcium silica, diatomaceous earth, etc. are also useful as additives to provide a more dilute composition when desirable. It is also possible to grind the compound and solid carrier together in a hammer mill or other grinding apparatus to provide a solid dust-like formulation or a finely divided concentrate that can be suspended in water for application as a suspension.

The concentration at which the active compounds may be used will vary widely, but a concentration will usually be selected to provide an ultimate concentration of up to about 50 mg. of compound per square inch of exposed surface (that is, the surface being protected). Surfaces containing as little as 1 mg. or less per square inch may be satisfactory for some applications. In general, however, compositions containing from about 0.5 to 25% by weight of the compound generally suit the requirements for obtaining effective repellency. Where tree seedlings, shrubs, trees or other plants are to be protected, the amount of agent will usually be between about 1 and 20 pounds of active ingredient per 100 gallons of treating solution or suspension which may be applied by spraying, dipping and the like.

In order to further illustrate the invention the following examples are given. The pentachlorobenzylmercaptan compounds used herein are novel compounds and are prepared in accordance with U.S. Serial No. 199,256, filed of even date herewith.

EXAMPLE 1.—PREPARATION OF COMPOUNDS

*Pentachlorobenzylisothiuronium Chloride*

Pentachlorobenzyl chloride (600 g.; 2 moles) was dissolved in 6 liters of boiling i-propyl alcohol and filtered. (Isopropyl alcohol was used for the solvent since the pentachlorobenzyl chloride was more soluble in it than in either methanol or ethanol.) The solid matter in the filtrate was redissolved by heating with steam. The solution was in a 12 liter flask fitted with a reflux condenser, and 152 g. thiourea (2 moles) mixed with 1800 cc. boiling i-propyl alcohol were added. The thiourea was only partially in solution. A precipitate started to form almost immediately. The mixture was refluxed for 2 hours with intermittent shaking and filtered hot. The precipitate was washed twice with methanol, then dried in an oven at 105° C. A second crop of crystals was obtained from the cooled filtrate. The first crop weighed 644 g. and the second 33 g., representing 86% and 4% yield respectively.

The product consisted of pearly, tan crystals of low bulk density. It was essentially insoluble in water, acetone, hexane, benzene, ether, and dioxane, and only very slightly soluble in boiling ether or i-propyl alcohol. It melted with decomposition at 284–290° C. A sample recrystallized from 95% ethanol was white, melted with decomposition at 286–287° C. and gave the following analysis (theoretical figures in parentheses): C, 26.50% (25.62); H, 1.82% (1.61); Cl, 55.83% (56.78); S, 8.22% (8.55); N, 7.59% (7.49).

*Pentachlorobenzylmercaptan*

Pentachlorobenzylthiuronium chloride, 100 g. (0.267 mole) was mixed with 3 liters of water containing 43 g. NaOH (1.07 moles) and heated with constant stirring at 85–90° C. for 3 hours. The mixture was filtered hot. The filtrate was acidified with dilute $H_2SO_4$ to produce a voluminous white precipitate. This was filtered off, washed several times with water, and dried in the open air. Four 100 g. batches were processed in similar fashion producing a total of 272 g. of the mercaptan at yields of 83–88%.

The product was a creamy white powder. It was insoluble in water, but soluble in alkali, alcohol, ether, benzene, acetone and hexane. It melted at 92–96° C. A sample recrystallized from 95% ethanol was still creamy white, melted at 92–94° C. and gave the following analysis (theoretical figures in parentheses): C, 28.49% (28.36); H, 1.32% (1.02); Cl, 59.31% (59.81); S, 10.50% (10.82).

*Preparation of Zinc Pentachlorobenzylmercaptide*

A hot solution of 16.3 g. (0.075 mole) of zinc acetate dihydrate in a mixture of 70 cc. of water, 200 cc. of acetone and 2 cc. of acetic acid was added to a hot solution of 44 g. (0.148 mole) of pentachlorophenylmercaptan in 500 cc. of acetone. The precipitate formed was filtered, washed with acetone and dried to obtain 45 g. (92.5%) of zinc pentachlorobenzylmercaptide which decomposed at 280–285° C. It analyzed as follows: Found: 26.0% C; 1.0% H; 9.5% S; 53.4% Cl; 10.9% Zn. Calculated: 25.6% C; 0.67% H; 9.7% S; 54.0% Cl; 10.9% Zn.

EXAMPLE 2.—EVALUATION OF PRODUCTS

Field mice (*Peromyscus maniculatus*) were offered 25 grams daily of wheat seed impregnated with a 2% preparation of zinc pentachlorobenzylmercaptide in an anionic emulsifier as a sticking agent ("Carbopol" 934). Repellency at the end of ten days was indicated by the percentage of food rejected with observations on any toxicity to the test animal. It was found that the treated seed caused a rejection of 87.8% as compared with 0% on the untreated checks. This gives a repellency rating of 3 which is good compared with the highest repellency rating of 4 and the lowest rating of 0. No toxicity to the animals was noted.

EXAMPLE 3

Following the general details of Example 2, the test compounds were evaluated as indicated in the following Table I.

TABLE I.—REPELLENT EFFECTS OF PENTACHLOROBENZYLMERCAPTAN DERIVATIVES AGAINST PEROMYSCUS MANICULATUS

| Agent | Weight percent active ingredient on seed | Formula ingredients | Preparation | Seed Consumed | | Percent Reduction in food intake | Percent mortality | |
|---|---|---|---|---|---|---|---|---|
| | | | | 1st day | 10 days | | 1st day | 10 days |
| Zinc pentachlorobenzylmercaptide | 2 | | Ground in mortar with sticking agent.[1] | 34 | 150 | 94 | None | None |
| Do | [2] 4 | 40% active agent, 10% yellow dextrin, 50% water. | do | 62 | 18.5 | 89.6 | | 40 |
| Pentachlorobenzylmercaptan | 1 | | Overcoat on latex coated seed. | 92 | 761 | 67 | None | 10 |

[1] Emulsifiable polyethylene dispersed in water with emulsifying and dispersing agents.
[2] Seed treated at this concentration germinated in soil without adverse effects.

EXAMPLE 4

Pentachlorobenzylmercaptan was used to impregnate wheat seed and evaluated against several additional species of mice. The following Table II indicates the repellent effects observed.

TABLE II.—REPELLENT EFFECTS OF PENTACHLOROBENZYLMERCAPTAN AGAINST MICE

| | Percent Concentration Active Ingredient on Seed | Formulation | Seed Consumed | | Percent Reduction in Food Intake | Mortality | |
|---|---|---|---|---|---|---|---|
| | | | 1st day | 10 days | | 1st day | 10 days |
| Swiss White Mice | 2 | 10% in acetone | 86.5 | 404.5 | 83.8 | 0 | 0 |
| Microtus sp | 2 | 16.2% in acetone | 44 | 141 | 94.4 | 0 | 0 |

The preferred agent for use is the zinc salt of pentachlorobenzylmercaptan and this agent will normally be sold in commerce as a liquid formulation of about 10% to 40% by weight active ingredient, the balance being an inert aqueous carrier containing one or more dispersing agents. In application, this commercial product is diluted to the desired concentration and sprayed or brushed onto the articles to be protected. Dip applications, particularly for bundles of forest or fruit tree planting stock are also useful and will be employed by the nurseryman.

Particularly desirable formulations for use in the commercial application of this invention are the following.

Formulation A:

| | Percent |
|---|---|
| Zinc pentachlorobenzylmercaptide | 20.0 |
| Water | 20.0 |
| Acrylic emulsion ("Rhoplex" AC 33) | 45.40 |
| Methyl cellulose (4% solution) | 14.60 |

The pentachlorobenzylmercaptide is ground in the water in a ball mill for 48–72 hours and then blended with remainder of the ingredients.

Formulation B:

| | Percent |
|---|---|
| Zinc Pentachlorobenzylmercaptide | 20.0 |
| Water | 34.2 |
| Acrylic emulsion ("Rhoplex" AC 33) | 45 |
| Methyl cellulose | 0.2 |
| Cetyl alcohol (1 part), methanol (5 parts) | 0.6 |

The pentachlorobenzyl mercaptide is finely ground (dry) and then blended with remainder of the ingredients.

It will be understood that numerous changes and variations may be made from the above description and examples without departing from the spirit and scope of the invention.

I claim:

1. The process of treating cereal grains to prevent consumption by rodents which comprises treating said grains with a rodent repelling amount of an aqueous formulation comprising as active ingredient a pentachlorobenzylmercaptan derivative of structure

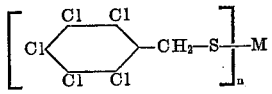

where M is a member of the group consisting of hydrogen and zinc and $n$ is a small digit corresponding to the valence of M.

2. The process of claim 1 wherein the active ingredient is pentachlorobenzylmercaptan.

3. The process of claim 1 wherein the active ingredient is zinc pentachlorobenzylmercaptide.

4. A formulation comprising water, a dispersing agent and from about 0.5 to 40% by weight of a compound of structure

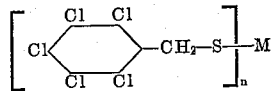

where M is a member of the group consisting of hydrogen and zinc and $n$ is a small digit corresponding to the valence of M.

5. A formulation as in claim 4 wherein the active compound is pentachlorobenzylmercaptan.

6. A formulation as in claim 4 wherein the active compound is zinc pentachlorobenzylmercaptide.

References Cited in the file of this patent

Welch: Agricultural and Food Chemistry, vol. 2, No. 3, pp. 142–9 (February 1954).